United States Patent [19]

Arbisi et al.

[11] Patent Number: 4,522,151
[45] Date of Patent: Jun. 11, 1985

[54] AERATOR

[76] Inventors: Dominic S. Arbisi, 13001 Berkshire Dr., Minnetonka, Minn. 55343; Coy E. Replogle, 8133 Portland Ave. South, Bloomington, Minn. 55420

[21] Appl. No.: 475,074

[22] Filed: Mar. 14, 1983

[51] Int. Cl.³ .......................... A01K 63/00; B01F 5/04
[52] U.S. Cl. .......................................... 119/3; 119/5; 261/76; 261/DIG. 75
[58] Field of Search ............... 119/3, 5; 210/169, 220, 210/221.1, 221.2; 261/76, 77, DIG. 75

[56] References Cited

U.S. PATENT DOCUMENTS

| | | | |
|---|---|---|---|
| 1,747,687 | 2/1930 | Wheeler | 261/75 |
| 3,320,928 | 5/1967 | Smith | 119/3 |
| 4,162,970 | 7/1979 | Zlokarnik | 261/DIG. 75 |
| 4,226,719 | 10/1980 | Woltman | 261/DIG. 75 |
| 4,389,312 | 6/1983 | Beard | 261/DIG. 75 |

*Primary Examiner*—Robert P. Swiatek
*Assistant Examiner*—Kris R. Schulze

[57] ABSTRACT

An aerator nozzle and system for aerating a body of liquid which includes a combined air and liquid discharge nozzle unit respectively supplied from an air compressor and a liquid pump wherein the nozzle unit includes a liquid discharge nozzle with an air dispersing nozzle therewithin to insure maximum air absorption into the body of liquid to be aerated.

6 Claims, 2 Drawing Figures

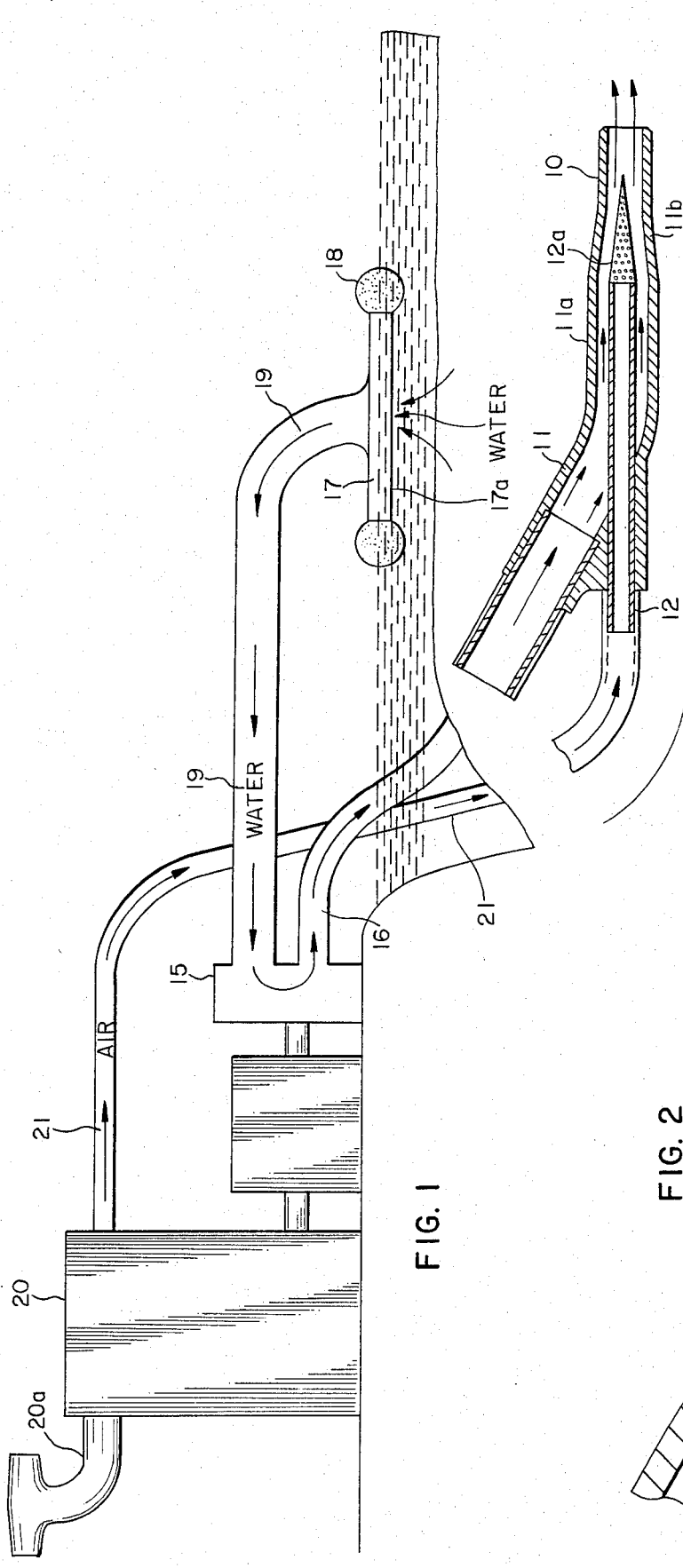
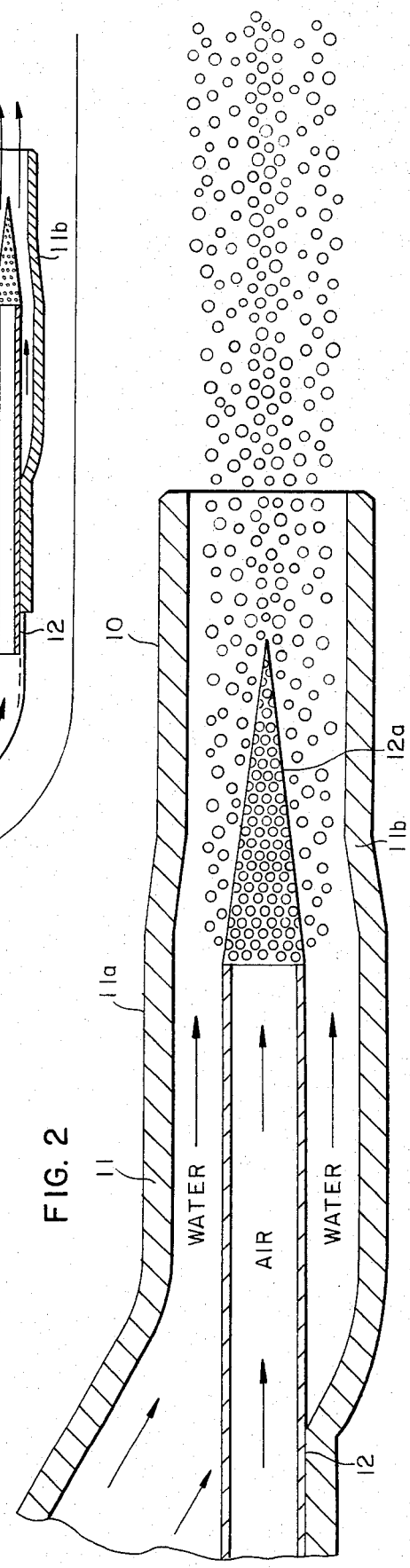
FIG. 1
FIG. 2

AERATOR

BACKGROUND OF THE INVENTION

In the past, most aerators have been designed with upwardly directed discharging jets and have not combined the flow of air under pressure with water under pressure wherein the supply water is provided from the surface area of the pond to be aerated, thus providing maximum air content in the supply water which is combined with pressurized air in a discharge flow directed substantially parallel to the bottom of the pond for maximum circulation and dispersion.

SUMMARY OF THE INVENTION

This invention consists in an aerator nozzle which combines a tapered pressurized air supply dispersion screen concentrically mounted within a converging nozzle through which water under pressure from a supply pump is discharged with the nozzle assembly being located in the bottom of the pond to be aerated and directed substantially parallel to the bottom of the pond for maximum circulation and dispersion. By discharging the combined dispersed air and water stream into the bottom of the body of water, the agitation of the rising air bubbles produces a very desirable side affect, i.e., to destratify the water body. Also, the system locates the water inlet for the pump on the surface of the pond so that the source of the water being supplied has maximum air content.

DESCRIPTION OF THE DRAWINGS

FIG. 1 is a diagrammatic view showing the arrangement of the complete liquid aerating system with the nozzle shown in vertical section in an enlarged scale; and FIG. 2 is a central vertical sectional view of the air and water mixing discharge nozzle.

DETAILED DESCRIPTION OF THE PREFERRED EMBODIMENT

This invention provides an aerating system as well as a specific nozzle construction, both of which are designed to produce maximum aerating efficiency for maintaining optimum aerated water for supporting aquatic life such as is required in fish hatchery and stocking ponds, as well as other bodies of water which require aeration.

The system includes a mixing and discharge nozzle 10 which includes an outer liquid supply conduit section 11 and an inner air supply conduit section 12 converging therewith and fixed thereto. The air supply conduit section 11 is concentrically arranged within an intermediate portion 11a of the liquid supply conduit section 11 which terminates in the discharge opening of nozzle 10. The air supply conduit section 12 has a conical diffusing member 12a fixed to the discharge end thereof which is located within the intermediate portion 11a of the water supply conduit section 11 and is secured thereto as by the fixed mounting between the two conduit sections 11 and 12.

The water and air supply sections 11 and 12 converge in fixed predetermined relation into the nozzle portion 10 to form a generally Y-shaped nozzle unit as illustrated. The portion of the water supply conduit 11a which surrounds the perforated air diffusing member 12a forms a frusto conical segment 11b as shown. This prevents the area of the annular water discharge passage surrounding the upstream portion of the conical air diffuser 12a from increasing as the water flows past the diffuser member 12a to maintain a venturi effect around the air diffusing conical member 12a.

Water is supplied under pressure to the discharge conduit section 11 as by a water pump 15 which discharges into a supply conduit 16 as shown in FIG. 1. Water is supplied to the pump 15 from a supply intake opening or disc 17, having a screen 17a, mounted on a suitable float structure 18 and connected with the pump inlet by a pump inlet conduit 19.

An air compressor 20 supplies air from intake 20a to the air supply conduit section 12 through a conduit member 21 as best shown in FIG. 1.

It will be seen that this invention provides an aerating system which includes pumping water from the upper surface of a pond through an aerating nozzle assembly to which an air supply is connected. Both the water and air may be supplied under pressure as by the water pump 15 and the air compressor 21, respectively. The air is discharged through the conical perforated diffusing member 12a which is concentrically arranged within an intermediate portion 11a of the water supply conduit 11 which delivers into the discharge nozzle 10 as illustrated.

The use of the water from the upper surface of the pond provides supply water which contains a higher percentage of oxygen than is contained in the water in the bottom of the pond. It is well-known that this is caused by the interaction of the algea in the water and the sunlight, and also by the difference between the lower density of the water at the surface as opposed to the higher density of the water in the bottom of the pond.

By locating the aerated water discharge at the bottom of the pond and directing the discharge in a generally horizontal direction, the aerated water is supplied to the lower portion of the water in the pond where there will be maximum absorbtion and utility and the action of the aerated water and water bubbles as they progress upwardly in the water body destratifies the water in the pond and distributes the aerated water vertically as well as horizontally in the pond.

What is claimed is:

1. A device for aerating liquid comprising,
   a nozzle member having a liquid discharge passage with an air discharge passage in spaced relation therewithin,
   means for supplying liquid under pressure to said liquid discharge passage,
   means for supplying air under pressure to said air discharge passage,
   a conical air dispersing member perforated throughout a substantial portion of its length and attached to the end of said air discharge passage to distribute the flow of air into a substantial length of the stream of liquid surrounding said perforated conical air dispersion member and discharging the air into said stream in small bubbles through the perforations in said conical air dispersing member,
   the end of the air and liquid discharge passage is spaced outwardly from the downstream end of the conical member,
   the liquid discharge passage has a frusto conical segment surrounding a substantial upstream portion of the length of said perforated conical member to maintain the velocity of the flowing liquid surrounding said perforated conical air dispersing member and provide a substantially reduced pressure zone surrounding said perforated member to increase the venturi action and the absorption of the air into the liquid stream within the nozzle unit.

2. An aerating system for enhancing the environment for aquatic life confined within a pond of water comprising, a nozzle member having a liquid discharge passage with an air discharge passage in spaced relation therewithin, means for supplying air under pressure to said air discharge passage, a conical air dispersing member perforated throughout a substantial portion of its length and attached to the end of said air discharge passage to distribute the flow of air into a substantial length of the stream of liquid surrounding said perforated conical air dispersing member and discharging the air into said stream in small bubbles through the perforations in said conical air dispersing member, the end of the air and liquid discharge passage is spaced outwardly from the downstream end of the conical member, the liquid discharge passage has a frusto conical segment surrounding a substantial upstream portion of the length of said perforated conical member to maintain the velocity of the flowing liquid surrounding said perforated conical air dispersing member and provide a substantially reduced pressure zone surrounding said perforated member to increase the venturi action and the absorption of the air into the liquid stream within the nozzle unit, a water pump, for supplying liquid under pressure to said liquid discharge passage, a water supply conduit connecting the water pump to the water discharge conduit for supplying water under pressure thereto, a float member having a water intake opening mounted thereon for supporting said intake opening submerged below the water surface of the pond but in close proximity to said water surface, a pump intake conduit connnected at its lower end to the air discharge conduit and at its upper end to a source of air supply for discharging air into the stream of water supplied by said pump through said water discharge conduit surrounding said air discharge conduit, and means for positioning said nozzle member in submerged, substantially spaced relation below the water surface of the pond and directing the air and water mixture substantially parallel to the bottom of the pond to insure aeration at the desired water depth and reduce stratification of the water in the pond.

3. The structure set forth in claim 2 and said air discharge conduit and said water discharge conduit being combined into a Y-shaped nozzle member particularly adapted to be oriented in substantially parallel relation to the bottom of said pond to produce a combined air and water discharge flow substantially parallel to said pond bottom.

4. The structure set forth in claim 2 and an air compressor connected to said air supply conduit for supplying air under pressure to said air discharge conduit.

5. The structure set forth in claim 4 and a perforated, conical member connected to the end of said air discharge conduit for distributing the flow of discharged air under pressure throughout a substantial length of the stream of flowing water surrounding said perforated member through said nozzle.

6. The structure set forth in claim 5 and the water discharge conduit having a frusto conical portion surrounding a portion of said perforated member to maintain the venturi effect within said nozzle.

* * * * *